Oct. 15, 1929.  A. J. CROWLEY  1,731,562

METHOD FOR FILTERING SULPHUR

Filed July 6, 1927

INVENTOR
ARTHUR J. CROWLEY
BY Charles S. Evans
HIS ATTORNEY.

Patented Oct. 15, 1929

1,731,562

UNITED STATES PATENT OFFICE

ARTHUR J. CROWLEY, OF SULPHUR, NEVADA, ASSIGNOR TO HUMBOLDT SULPHUR COMPANY, OF SULPHUR, NEVADA, A CORPORATION OF DELAWARE

METHOD FOR FILTERING SULPHUR

Application filed July 6, 1927. Serial No. 203,793.

My invention relates to an apparatus and method for filtering sulphur.

One of the objects of the invention is to filter molten sulphur in a manner which will prevent the solidification of the sulphur in its passage thru the filtering medium.

Another object of the invention is to cause a constant volume of molten sulphur to be present upon both sides of the filtering medium so as to prevent the filtering medium from chilling.

Another object of the invention is to cause the sulphur to take an upward path thru the filtering medium, so that upon reversal of the flow of sulphur, the filtering medium may be flushed.

The invention possesses many other objects and valuable features, some of which will be set forth in the following description of the invention which is illustrated in the drawings forming part of the specification. It is to be understood that I do not limit myself to the showing made by the said description and drawings, as I may adopt varying forms of my invention within the scope of the claims.

Referring to the drawings.

Figure 1:
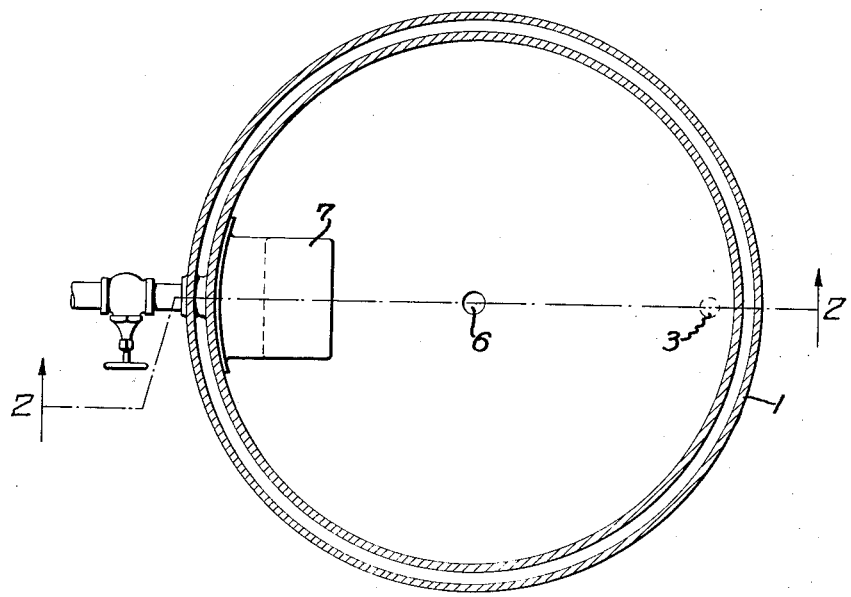
Fig. 1 is a vertical sectional view thru the center of the filtering tank, taken on line 1—1 of Fig. 2.
Figure 2:
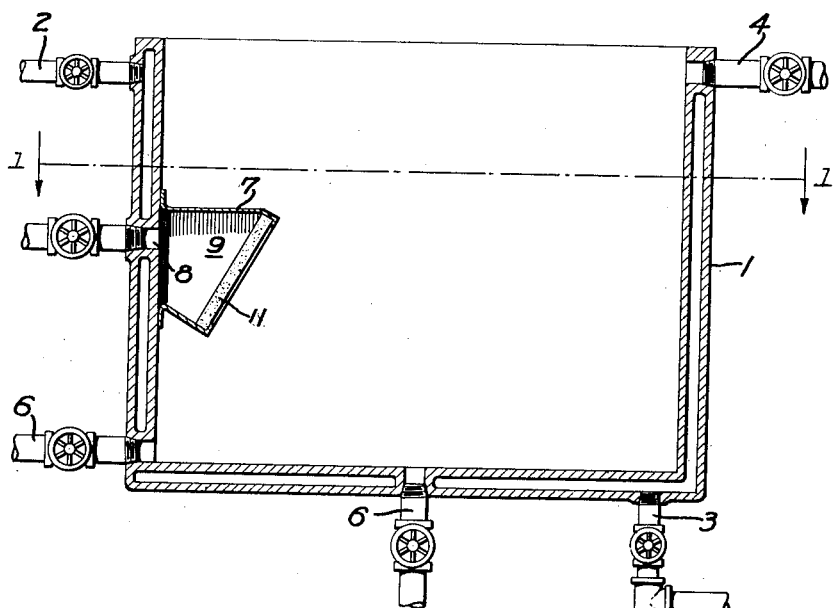
Fig. 2 is a horizontal sectional view of the filtering tank and filter taken on line 2—2 of Fig. 1.

One of the great difficulties in filtering sulphur is the tendency for the sulphur to become chilled upon contact with the filtering medium due to the slowness with which it passes therethrough. This causes a congealing of the sulphur and a consequent clogging of the filtering medium. The present invention overcomes this difficulty for a bath of molten sulphur is maintained about the filtering medium to prevent the chilling thereof.

In terms of broad inclusion my invention comprises a filtering tank which is steam jacketed to heat the molten sulphur within the tank. Molten sulphur is admitted into the tank near the top thereof, while drain pipes for draining the tank are located near the bottom thereof. Between the bottom of the tank and the sulphur inlet passage is a filtering passage, extending into the tank and thru the wall thereof, across which a filtering medium is placed. The molten sulphur in the tank is maintained at a level above the filtering passage so as to envelop the passage, and since the filtering medium across the passage is within the tank, it is thus subjected to a constant volume of sulphur on both sides thereof, while the sulphur being in molten condition keeps the filtering medium heated so as to prevent the congealing of the sulphur passing therethrough. The portion of the filtering passage within the chamber is preferably wider than the portion of the passage thru the wall thereof, thus insuring a constant volume of sulphur on the outlet side of the filter. Furthermore, the head of sulphur within the chamber is sufficient to cause a flow of sulphur thru the filtering medium and thru the filtering passage out of the chamber, where it can be collected in any convenient manner. Preferably the filtering medium is positioned so that all or a greater portion thereof will be below the portion of the filtering passage in the wall of the tank, in order that when the tank is drained, the sulphur in the portion of the filtering passage within the chamber will flow thru the filtering medium, thus flushing it.

In detail, my invention includes a steam jacketed tank 1, having a pipe 2, for the introduction of the heating steam into the jacket and which is located near the top of the tank, and a steam outlet and drain pipe 3 for draining the condensate and steam from the jacket and located in the bottom of the tank. A sulphur inlet pipe 4 located near the top of the tank permits the passage of molten sulphur into the tank, while drain pipes 6 permit the draining of sulphur from the tank. Between the bottom of the tank and the sulphur inlet pipe, is located a filtering passage 7, having a portion 8 projecting thru the wall of the tank and a portion 9 projecting into the tank. The portion 9 within the tank is preferably larger in cross section than the portion 8 within the wall of the tank, for the purpose of causing a restriction of the flow of sulphur thru the passage in order to keep the sulphur against the entire area of the outlet side of the filter plate. The slope of the bottom wall of the portion of passage 9 within the chamber and/or the angle at which the filtering medium 11 is placed across the passage are so designed to cause the sulphur in passage 9 to flow thru the filtering medium 11, upon the draining of the sulphur from the tank, thus flushing the filtering medium. The filter is preferably a plate consisting of fused particles of alundum, but other filtering mediums may be used, such as fine wire screens.

From the recited description of the apparatus it will be seen that by maintaining the level of sulphur above the filtering passage, the sulphur will pass thru the filtering medium and there will always be a constant volume of sulphur on both sides of the filtering medium, thus insuring a complete immersion of the filtering medium within a bath of molten sulphur. At the same time the temperature of the molten sulphur upon both sides of the filtering medium will be approximately the same, since the molten sulphur surrounding the portion of the bath within the filtering passage will act as a means for maintaining the sulphur within the passage in heated and molten condition.

The above described process may be carried on by having a plurality of filtering passages and filters within the tank.

I claim:

1. A method of filtering sulphur which comprises melting the sulphur and passing it through a filtering medium so as to maintain a constant volume of sulphur on each side of the filtering medium.

2. A method of filtering sulphur which comprises melting the sulphur and passing it through a filtering medium so as to maintain a constant volume of sulphur, and approximately an equal temperature on each side of the filtering medium.

3. A method of filtering sulphur which comprises melting the sulphur and exposing the entire surface area of each side of the filtering medium to a constant volume of the sulphur.

4. A method of filtering sulphur and flushing a filtering medium, which comprises melting the sulphur, passing it through the filtering medium, and reversing the flow of sulphur to clean the filtering medium.

In testimony whereof, I have hereunto set my hand.

ARTHUR J. CROWLEY.